Feb. 27, 1968   J. J. FESCO   3,370,406
VACUUM CLEANER FILTER BAG
Filed Nov. 29, 1963   2 Sheets-Sheet 1
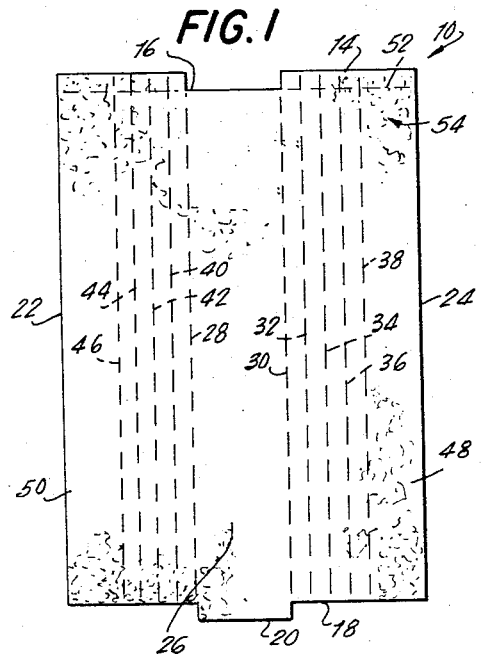
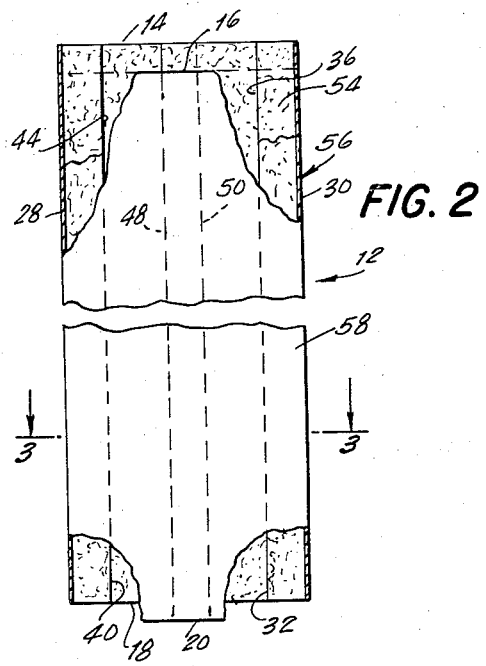
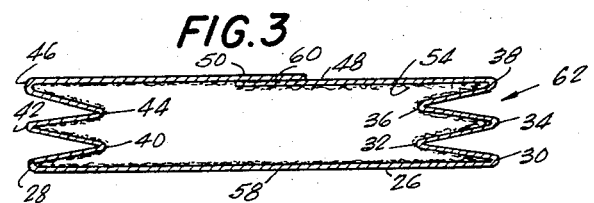
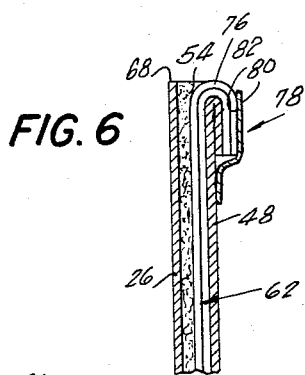
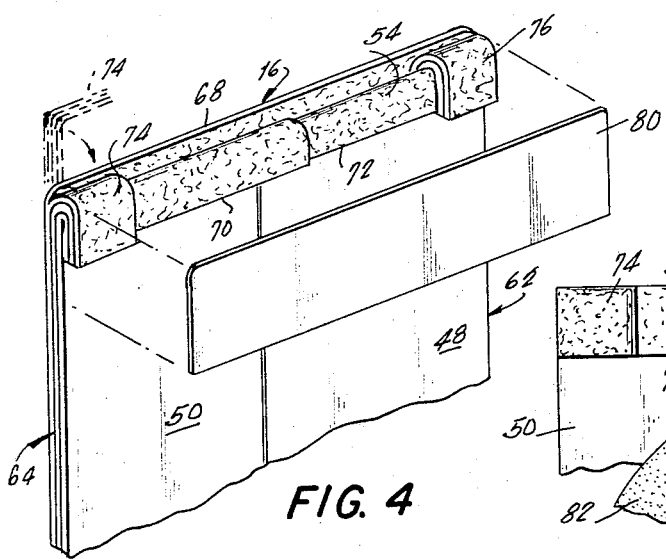
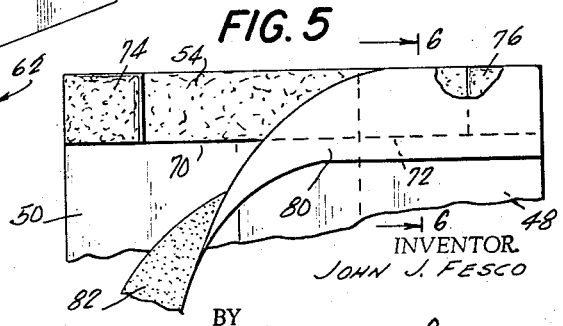
INVENTOR.
JOHN J. FESCO
BY
Friedman & Goodman
ATTORNEYS

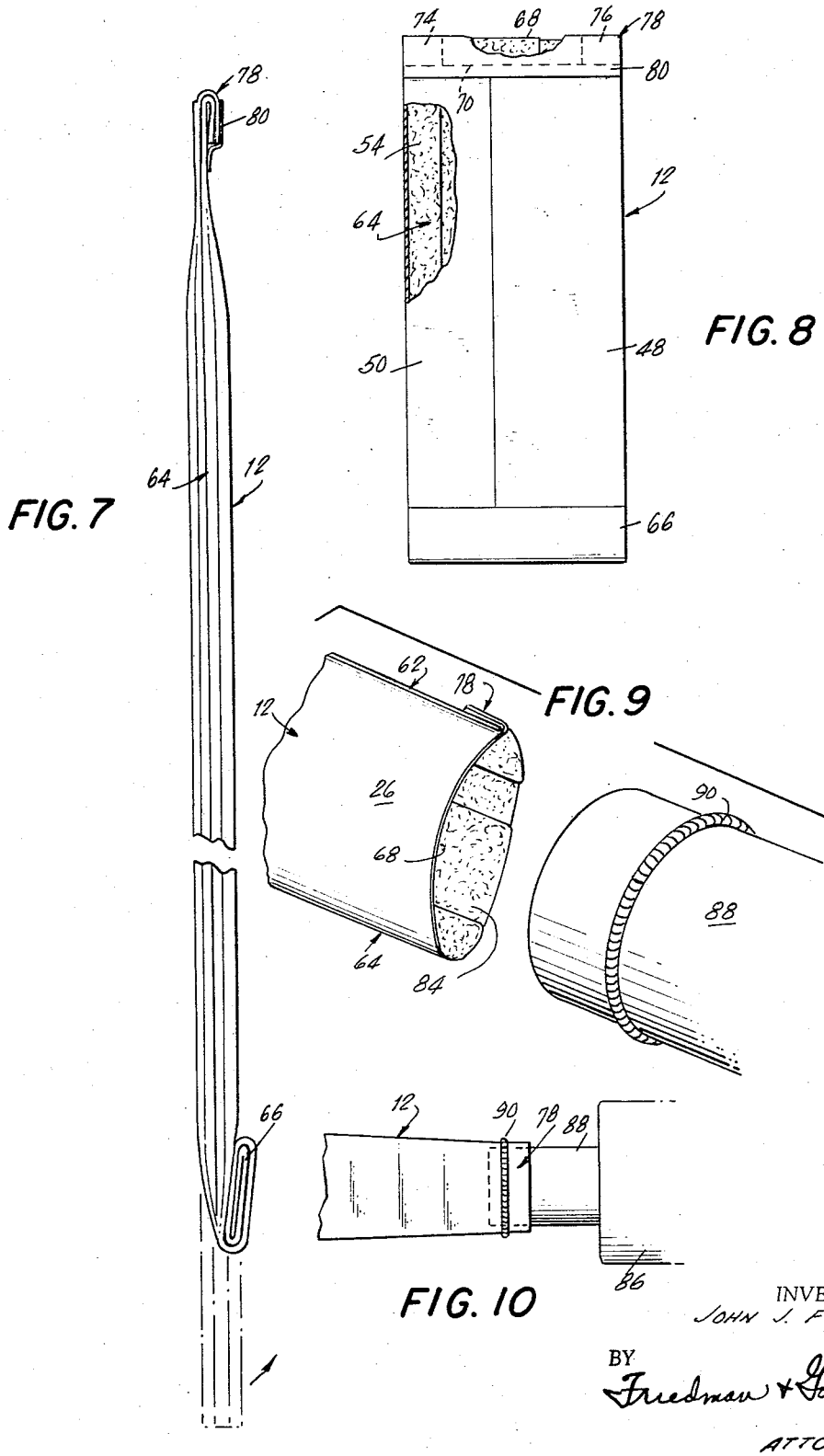

United States Patent Office 3,370,406
Patented Feb. 27, 1968

3,370,406
VACUUM CLEANER FILTER BAG
John J. Fesco, Baldwin, N.Y., assignor to Studley Paper
Company, Inc., a corporation of New York
Filed Nov. 29, 1963, Ser. No. 326,978
4 Claims. (Cl. 55—377)

The present invention relates in general to a bag and in particular to a bag which is eminently suitable for use as a disposable filter bag in a vacuum cleaner.

Modern vacuum cleaners utilize disposable filter bags in order to remove dust and debris from the air-stream within the vacuum cleaner and to store the removed dust and debris until the filter bag and its contents may be removed from the vacuum cleaner for convenient disposal. This eliminates the unsanitary and otherwise highly undesirable characteristics of the formerly utilized permanent type of filter bag incorporated within the vacum cleaner. The disposable filter bag must be made of relatively inexpensive material and must be produced by relatively inexpensive manufacturing operations so that it may be sold at a relatively low price. In order to provide for the entry of an air flow stream into the filter bag, as when used in a vacuum cleaner, the filter bag is usually provided wtih some form of collar so as to provide a suitable mounting means for the inlet fitting or conduit of a vacuum cleaner and to provide access into the interior of the bag. Heretofore, the collars provided on vacuum tube filter bags have been relatively complicated devices with the result that the collar portion of the bag has been a relatively expensive component thereof so as to increase the overall cost of the bag.

In view of the foregoing, it is an object of the present invention to provide a filter bag having a highly novel and efficient collar construction which can be manufactured at a relatively low cost.

It is another object of the present invention to provide a generally improved filter bag having a generally improved and simplified collar construction.

It is a further object of the present invention to provide a filter bag which is especially useful in connection with the new broom type or stick type of vacuum cleaner.

It is a still further object of the present invention to provide a vacuum cleaner filter bag of generally improved filtering action.

Other and further objects of the present invention will be readily apparent to one skilled in the art from a consideration of the following specification taken in connection with the appended drawings.

In the drawings which illustrate the best mode presently contemplated for carrying out the invention, FIGURE 1 is a plan view of a blank from which a filter bag pursuant to the present invention is formed;

FIGURE 2 is a plan view and shows the blank folded upon itself with the free longitudinal edges thereof secured together to form an elongated tubular structure from which the filter bag pursuant to the present invention is formed;

FIGURE 3 is a sectional view on an enlarged scale taken on the line 3—3 of FIGURE 2;

FIGURES 4 and 5 are fragmentary views on an enlarged scale and illustrate hte steps involved in providing the tubular construction of FIGURE 2 with a collar pursuant to the present invention;

FIGURE 6 is a fragmentary sectional view on an enlarged scale taken on the line 6—6 of FIGURE 5;

FIGURE 7 is an end elevation view of a filter bag pursuant to the present invention;

FIGURE 8 is a side elevation view of a filter bag pursuant to the present invention on a reduced scale compared with FIGURE 7 and portions being broken away for purposes of illustration;

FIGURE 9 is a view which illustrates the manner in which the filter bag of the present invention is mounted on an air inlet conduit of a vacuum cleaner; and FIGURE 10 illustrates the filter bag mounted in position on the air inlet conduit of the vacuum cleaner.

Referring now to the drawings in detail, FIGURE 1 illustrates a blank 10 from which there is formed a vacuum cleaner filter bag 12 as illustrated in FIGURE 8. It will be understood that the blank 10 is cut preferably by automatic machinery from a supply of filter paper having the required porosity for use in a vacuum cleaner. The blank 10 is substantially rectangular in conformation having an upper marginal edge 14 which is provided substantially centrally thereof with a recess 16. The blank 10 is provided with a lower marginal edge 18 which is provided substantially centrally thereof with an integral projection 20. It will be understood that when the edge 18 provided with the projection 20 is cut from a supply of filter paper to form the blank 10, there is simultaneously formed the upper edge 14 provided with the recess 16 for the next following or succeeding blank to be cut from the filter paper supply. The blank 10 is provided also with the opposing longitudinal edges 22 and 24. It will be noted that the recess 16 and the projection 20 define the upper and lower marginal edges of an integral central panel 26 within the blank 10. The longitudinal sides of the panel 26 are defined by the longitudinally extending fold lines 28 and 30. Four additional fold lines 32, 34, 36 and 38 are defined between the fold line 30 and the longitudinal edge 24. Similarly four additional longitudinal fold lines 40, 42, 44, and 46 are defined between the longitudial fold line 28 and the opposite longitudinal edge 22. It will be noted that each group of five fold lines is equally spaced from the adjacent fold line in the group. Furthermore it will be noted that between the fold line 38 and the side edge 24 there is defined an integral longitudinal panel 48. Similarly between the fold line 46 and the opposite longitudinal edge 22 there is defined an integral longitudinal panel 50. Provision is also made for a transverse fold line 52 adjacent the upper marginal edge 14 which fold line 52 is coextensive with the base of the recess 16. Pursuant to a feature of the present invention, the blank 10 is provided on one surface 54 thereof which is lined with a coating of fibres the function of which will presently be disclosed. However, it will be understood that the coated surface 54 does not detract in any manner from the porosity of the blank 10 so that air flow through the blank 10 is not in any manner inhibited by the fabric material lining 54 thereof.

In order to form the filter bag 12 the blank 10 is first folded upon itself to form the open ended tubular member 56 illustrated in FIGURE 2. It will be understood that the folding of the blank to form the tube 56 is automatically affected by suitable automatic machinery. It will be noted that when the blank is folded to form the tube 56 the fabric lined surface 54 forms the inner surface of the tube the outer surface 58 thereof being free of the lining. In forming the tube 56, the integral panel 50 overlaps the integral panel 48 and the overlapped portions are suitably secured together as by a suitable adhesive as at 60. The first series of longitudinal fold lines 30, 32, 34, 36 and 38 define one set of pleats generally indicated by the reference numeral 62 along one side of the tube and the second set of fold lines 28, 40, 42, 44 and 46 define a second set of pleats generally indicated by the reference numeral 64 along the opposite side edge of the tube 56 so that the overlapping integral panels 48 and 50 oppose the integral panel 26. The lower end of the tube 56 which includes the integral projection 20 is folded upon itself to form a triple seal lock which is generally indicated by the reference numeral 66. The manner in which such a seal is formed is illustrated and described in Patent No. 3,107,989, issued on Oct. 22, 1963 to J. J. Fesco.

By reference to FIGURE 4, it will be apparent that when the blank 10 is folded to form the tube 56, the panels 50 and 48 extend above the panel 26 at the upper edge of the tube due to the recess 16 which now defines the upper edge 68 of the panel 26. The upper marginal edge of the panel 50 is indicated by the reference numeral 70 and the upper marginal edge of the panel 48 is indicated by the reference numeral 72. Furthermore, it will be apparent that the upper ends of the pleats 64, said upper ends being generally designated by the reference numeral 74 and similarly the upper ends 76 of the pleats 62 also extend above the upper edge 68 of the panel 26 since the pleats 62 and 64 are coextensive with the associated panels 48 and 50.

The highly novel collar of the present invention is generally indicated by the reference numeral 78. In order to form the collar 78, the upper ends 74 and 76 of the pleats 64 and 62 respectively extending above the upper marginal edge 68 of the panel 26 and the upper portions of the panels 50 and 48 which also extend above the upper marginal edge 68 are folded back upon the panels 48 and 50 as best shown in FIGURE 4. Said folded over portions are then retained in the folded over disposition thereof by securing thereover a band 80 provided with an adhesive coating 82. Consequently, it will be apparent that the collar 78 which now defines the upper end opening 84 for the filter bag 12 is defined by the upper free marginal edge 68 of the panel 26 and the opposing folded over pleat portions 74 and 76 and the associated folded over upper edge portions of the panels 50 and 48 all secured together in folded over disposition by the adhesive strip 80. It will be apparent that the folded over upper ends of the pleats are retained against spreading by the band 80 and the folded over lower ends of the pleats are retained against spreading by the previously mentioned triple seal 66.

It will be noted that the bag 12 is of elongated rectangular conformation being especially suitable for use in the stick type or broom type of vacuum cleaners. Such a vacuum cleaner is generally indicated by the reference numeral 86 and is provided with an air inlet conduit 88 through which the dust laden air is introduced into the interior of the vacuum cleaner. In order to mount the bag 12 on the conduit 88, the collar 78 of the bag is urged on to the end of the conduit 88 so that the conduit extends into the end opening 84 of the bag. Thereafter the retaining ring 90 provided on the conduit 88 is moved into position to overlie the collar 78 as best illustrated in FIGURE 10 so as to releasably secure the collar in position on the conduit.

As previously indicated, the paper of which the bag is formed has the required degree of porosity so that the dust laden air coming into the bag through the conduit 88 may pass through the walls of the bag which provide the necessary filtering action so that the dust remains within the bag 12. The coating 54 is formed of randomly distributed short fibres formed of a suitable material. The fibres may either be formed of a natural or a synthetic material and are suitably applied on the inner surface of the bag so as to coat said surface. The fibrous coating 54 does not interfere with or decrease the porosity of the paper so that the air can freely flow through the bag wall. However, the fibrous coating greatly increases the filtering action due to the fact that the short fibres are especially effective to entrap small particles of dust brought in with the air into the bag 12. By trapping the small dust particles, clogging of the porous bag walls is prevented.

It will be understood that various changes and modifications may be made in the present invention without however departing from the inventive concept thereof as set forth in the appeneded claims.

I claim:

1. A vacuum tube filter bag comprising an elongated tubular body formed of air pervious sheet material, said body having opposing front and rear panels interconnected by pleated side walls, said panels and walls being integral, said body being closed at one end thereof and open at the other end thereof, said pleated side walls being retained against expansion at said open end, and said open end constituting a mouth defined by a continuous circular edge and folded means integral with said body for reinforcing only a semi-circular portion of said mouth.

2. A vacuum tube filter bag as in claim 1, said folded integral means being folded over portions of said pleated side walls and one of said opposing panels at said open end of said body.

3. A vacuum tube filter bag as in claim 2, and means for securing said folded over portions in folded disposition thereof.

4. A bag comprising a blank of sheet material folded upon itself to form a tube in which one longitudinal edge thereof overlies and is secured to another longitudinal edge thereof, one end of said tube being sealed and the other end of said tube being open, said tube having longitudinal pleats defined at opposite longitudinal edges thereof, said pleats extending between the opposite ends of said tube, said bag having opposing sides, one of said sides being coextensive with the upper ends of said pleats, the other of said sides being shorter than said one side, the upper ends of said pleats and said one side being folded over on a line which is in the plane of the free marginal edge of said other side to define a circular mouth provided with a semicircular collar, and means securing said folded over upper ends in said folded condition thereof.

References Cited

UNITED STATES PATENTS

| 1,341,834 | 6/1920 | Nelson et al. | 229—53 |
| 2,041,375 | 5/1936 | Schmerler | 229—1.5 |
| 2,225,389 | 12/1940 | Osterdahl | 55—381 X |
| 2,295,981 | 9/1942 | White | 55—381 X |
| 2,418,371 | 4/1947 | Smellie | 55—382 |
| 2,582,286 | 1/1952 | Schenck | 229—62 |
| 2,641,333 | 6/1953 | Woessner | 55—382 X |
| 2,732,911 | 1/1956 | Gall | 55—368 |
| 2,751,041 | 6/1956 | Cropley | 55—381 X |
| 2,804,166 | 8/1957 | Stevens et al. | 229—62.5 X |
| 2,909,238 | 10/1959 | Lofgren | 55—382 |
| 3,104,797 | 9/1963 | Langenfeld | 229—53 |

FOREIGN PATENTS 503,802    6/1954    Canada.

OTHER REFERENCES

Lekuse, German printed application No. 1,095,428 kL. 34C 5/70, printed December 1960.

FRANK W. LUTTER, *Primary Examiner.*

HARRY B. THORNTON, *Examiner.*

D. TALBERT, *Assistant Examiner.*